3,485,821
PROCESS FOR PREPARING CAPROLACTAM AND
ITS ALKYL SUBSTITUTED DERIVATIVES
Desmond Sheehan, Hamden, Conn., assignor to The
Techni-Chem Company, Wallingford, Conn.
No Drawing. Continuation-in-part of application Ser. No. 642,146, May 29, 1967. This application Apr. 1, 1968, Ser. No. 717,998
Int. Cl. C07d 41/06
U.S. Cl. 260—239.3   15 Claims

ABSTRACT OF THE DISCLOSURE

Caprolactam is produced by heating 6-aminocaproic acid or 6-aminocaproamide with water or aqueous solutions which do not hydrolyze caprolactam, the concentration of the amino caproic acid or caproamide being from 5% to 25% and the temperatures from 150° to 350° C. The caprolactam is produced in quantitative yield at high conversion with substantially no contamination with polymers. Substituted 6-aminocaproic acids, such as 3,3,5 - trimethyl and 3,5,5 - trimethyl-6-aminocaproic acids, also afford the corresponding lactams.

RELATED APPLICATIONS

This application is a continuation-in-part of my co-pending application Ser. No. 642,146, filed May 29, 1967, and now abandoned.

BACKGROUND OF THE INVENTION

Caprolactam is an important raw material for producing one form of superpolyamide, usually referred to as nylon-6.

Caprolactam is ordinarily prepared from cyclohexanone-oxime by the Beckmann rearrangement.

The process is effective and is used on an enormous commercial scale. However, the cost is quite high and so there remains a demand for a more economical process.

It has also been proposed to heat 6-hydroxycaproic acid or its amide with ammonium hydroxide but this requires uneconomically long times, e.g. 10 hours.

Caprolactam can be hydrolyzed by aqueous acids, such as hydrochloric acid, and it has even been stated in German Patent 812,076 that caprolactam can be hydrolyzed by heating with 8 parts of water to 250° C. for a number of hours. The patent states that 6-aminocaproic acid is produced.

SUMMARY OF THE INVENTION

In the present invention preformed 6-aminocaproic acid or 6-aminocaproamide or suitably alkyl substituted derivatives or mixtures are heated with water in concentrations from 5% to 25% at temperatures from 150° to 350° C.

Surprisingly enough, in spite of the statements in the German patent referred to above, a quantitative yield of caprolactam is obtained, at high conversion, and the caprolactam is not contaminated with any significant amounts of polymer and so is in a form of desirable purity, constituting an excellent raw material for the production of nylon-6 by the conventional polymerization procedures.

The process is very cheap as preformed 6-aminocaproic acid has become available at low cost. The economical processes for producing this product sometimes produce the acid alone and in other variants mixtures of the 6-aminocaproic acid and 6-aminocaproamide. As the two compounds are equally useful in the present invention, it does not make any difference which one is used or if a mixture is used, it being unnecessary to separate the constituents.

The reaction medium is a polar liquid, water being very suitable, also aqueous solutions such as ammonium hydroxide or solutions of ammonium chloride and the like. Of course, the aminocaproic acid or caproamide must be soluble in the aqueous solutions at reaction temperature. The solutions must not be those which result in hydrolysis of the caprolactam, such as, for example, hydrochloric acid. Because of its cheapness and excellent results obtainable therewith, water is preferred as a solvent or reaction medium, although in its broader aspects the invention is not limited thereto.

The reaction, as in many organic reactions, is an equilibrium which is a function of time and temperature, longer times being required at lower temperatures for the reaction to reach equilibrium and shorter times being practical at higher temperature. For this reason the higher portion of the temperature range, between 200° and 300° C., is preferred, although the invention is not limited thereto in its broader aspects.

The reaction mechanism involves a cyclizing to the 7-membered lactam ring, with splitting off of water or ammonia depending on the particular raw material used. Therefore, it could not be predicted that the process would operate with high efficiency because of the fact that the conditions are those under which one would expect that hydrolysis of the lactam would take place, and in fact this erroneous assumption was actually made in the German patent referred to above. Therefore, it is not intended to limit the invention to any theory of why the reaction proceeds to produce caprolactam in high yields, approaching quantitative yields, even though the conditions are those which one would ordinarily expect to result in substantial hydrolysis of the lactam.

Recovery of the caprolactam from solution in the water or other aqueous solution presents no significant problem as the solvent can be removed by conventional means, such as evaporation, for example under reduced pressure, or by extraction with a suitable solvent such as chloroform, and the aqueous phase containing residual aminocaproic acid can be recycled. The final recovery of the lactam in a state of high purity does not, strictly speaking, form a part of the present invention as the recovery is made by well known processes. In fact it is an advantage of the present invention that the recovery of the caprolactam does not require the development of new techniques and can be effected simply and economically. Marked savings in the cost of production of caprolactam are obtainable over the conventional methods of preparation from cyclohexanoneoxime. Suitably substituted 6-aminocaproic acids (e.g., 3,3,5-trimethyl-6-aminocaproic acid) can be similarly converted to the corresponding lactams.

When the range of solvents, such as water, is not extremely critical, too high a concentration of the amino caproic acid or amino caproamide tends to result in the production of an impure product contaminated with polymers, particularly at the higher temperatures. As the presence of polymers is undesirable and their separation from the caprolactam somewhat expensive, the preferred practical economical range of 5% to 25% concentration represents a real operating advantage. This is not to say that the reaction does not proceed with higher concentrations, but as we are dealing with a practical process for producing a chemical used on a very large scale, cost is the most important advantage and, therefore, the reaction conditions which produce pure caprolactam are greatly to be preferred.

DESCRIPTION OF THE PREFERRED EMBODIMENTS

The invention will be illustrated in connection with typical examples, but is, of course, not limited to the de-

Example 1

A solution of 20 parts of 6-aminocaproic acid in 100 parts of water was heated in a steel bomb for 1 hour at 240° C. The bomb was rapidly cooled and the aqueous solution extracted three times with 100 parts of chloroform. The chloroform was separated and evaporated to afford 12 parts of caprolactam, M.P. 67.5–69° C. (70% conversion). The aqueous phase on evaporation gave the balance of the material as unreacted 6-aminocaproic acid.

Example 2

A solution of 5 parts of 6-aminocaproic acid in 100 parts of water was treated in the manner described in Example 1. The chloroform extract gave 3.5 parts of caprolactam and the aqueous layer gave 1 part of amino acid indicating a quantitative yield at 80% conversion.

Example 3

A solution of 20 parts of 6-aminocaproic acid in 100 parts of water was treated as in Example 1 but at 260° C. the amino acid was 77% converted to caprolactam.

Example 4

A solution of 5 parts of 6-aminocaproic acid in 100 parts of water was treated as in Example 3; 90% of the amino acid was converted to caprolactam.

Example 5

Two solutions of similar composition to the solutions in Examples 3 and 4 (20 parts and 5 parts of 6-aminocaproic acid each in 100 parts of water) were treated for 45 minutes at 280° C. The conversions to lactam were 84% and 90% respectively.

Example 6

A solution of 20 parts of 6-aminocaproic acid in 100 parts of water was heated for 30 minutes at 300° C. The yield of caprolactam was again quantitative at 86% conversion.

Example 7

A solution of 15 parts of 6-aminocaproic acid in 100 parts of water was heated at 300° C. for 15 minutes. The conversion to caprolactam was 90%.

Example 8

Instead of using pure 6-aminocaproic acid, as in Examples 1 and 2, a crude product was used as obtained from the hydrogenation step in the production of the aminocaproic acid. One liter of an approximately 1 N solution of the crude 6-aminocaproic acid in 1 N aqueous ammonia was withdrawn from a hydrogenation reactor and heated in a sealed autoclave for 2 hours at 260° C. The mixture was then cooled and the solution extracted with three 500 ml. portions of chloroform. The conversion was about 70% to caprolactam and the isolated product was substantially pure and free from polymer.

Example 9

The procedure of Example 8 was repeated but before heating the ammonia solution was neutralized with aqueous hydrochloric acid so that the reaction medium was a water solution of ammonium chloride. The results were substantially the same, the conversion running between 65% and 70%.

Example 10

A solution of 5 parts of 6-aminocaproic acid in 40 parts of water containing 0.01 part of iodine was heated to 240°–250° C. for 1 hour. On cooling and extracting with chloroform and evaporating the chloroform, a conversion of approximately 63% to caprolactam was obtained. As in the case of some of the earlier examples, it is apparent that the 1-hour heating did not carry the reaction entirely to completion.

Example 11

The procedure of Example 10 was repeated but instead of the iodine, 1 part of phosphoric acid was added to the water solution of 6-aminocaproic acid. The conversion was somewhat improved, being approximately 75%.

Example 12

The procedure of Example 10 was repeated but instead of the iodine, 0.25 part of zinc chloride was added to the solution of 6-aminocaproic acid. The conversion was further improved to about 79% of theory.

Example 13

A solution of 33 parts of 6-aminocaproic acid in 100 parts of water was heated to 300° C. for 45 minutes; 1 part of polyamide separated on cooling and was filtered. From the filtrate it was shown that the conversion of amino acid to lactam was 76%.

Example 14

5 parts of 6-aminocaproamide were dissolved in 40 parts of water and the mixture heated at 260° C. Subsequent extraction of the cooled aqueous solution with chloroform and evaporation yielded caprolactam in quantitative yield at 75% conversion.

It will be apparent from the preceding examples that the conversion to caprolactam varies with temperature and with the amount of water in the reaction. This is summarized in the following table:

6-AMINOCAPROIC ACID CONVERSION TO CAPROLACTAM

| | Time, mins. | Temp., ° C. | Conversion, percent of theory |
|---|---|---|---|
| Parts amino acid per 100 parts H₂O: | | | |
| 20 | 60 | 240 | 70 |
| 15 | 60 | 240 | 74 |
| 5 | 60 | 240 | 90 |
| 20 | 60 | 260 | 77 |
| 15 | 60 | 260 | 84 |
| 5 | 60 | 260 | 90 |
| 20 | 45 | 280 | 83 |
| 15 | 45 | 280 | 88 |
| 5 | 45 | 280 | 90 |
| 20 | 30 | 300 | 88 |
| 15 | 15 | 300 | 90 |

Example 15

A solution consisting of 20 parts of the mixed isomers, 6-amino-3,3,5-trimethyl caproic acid and 6-amino-3,5,5-trimethyl caproic acid, in 100 parts of water, was heated to 280° C. for 45 minutes. Chloroform extraction afforded a mixture of isomeric trimethylated caprolactams —i.e., 4,4,6 - trimethyl-2-oxo-hexamethyleneimine and 4,6,6-trimethyl-2-oxo-hexamethyleneimine. The yield was quantitative at 80% conversion.

I claim:

1. A process for producing caprolactam or alkyl derivatives thereof which comprises in combination,
    (a) heating 5% to 25% solution of a compound selected from the group consisting of preformed 6-aminocaproic acid, 6-aminocaproamide, alkyl substituted derivatives, and mixtures thereof in a medium consisting essentially of an aqueous solvent selected from the group consisting of water, ammonium hydroxide, and aqueous solutions of ammonium salts at a temperature between 150° and 350° C. until the reaction is substantially complete, and
    (b) recovering the caprolactam therefrom.

2. A process according to claim 1 in which an unsubstituted caprolactam is produced from unsubstituted 6-aminocaproic acid or 6-aminocaproamide.

3. A process according to claim 2 in which a solution of preformed 6-aminocaproic acid is heated.

4. A process according to claim 3 in which the solvent is water.

5. A process according to claim 1 in which the solvent is water.

6. A process according to claim 2 in which the solvent is water.

7. A process according to claim 5 in which the temperature is between 200° and 300° C.

8. A process according to claim 1 in which the temperature is between 200° and 300° C.

9. A process according to claim 2 in which the temperature is between 200° and 300° C.

10. A process according to claim 4 in which the temperature is between 200° and 300° C.

11. A process according to claim 8 in which the solvent is aqueous ammonium hydroxide.

12. A process according to claim 9 in which the solvent is aqueous ammonium hydroxide.

13. A process according to claim 1 in which the 6-amino caproic acid is a trimethyl-6-aminocaproic acid, the methyl groups being attached to the 3 and 5 carbon atoms.

14. A process according to claim 13 in which the solvent is water.

15. A process according to claim 14 in which the temperature is approximately 280° C.

References Cited

UNITED STATES PATENTS 2,071,253   2/1937   Carothers _____ 260—239.3

HENRY R. JILES, Primary Examiner

R. T. BOND, Assistant Examiner